June 27, 1933.  G. MEMINI  1,916,061
AIRCRAFT CARBURETOR
Filed April 4, 1931  2 Sheets-Sheet 1
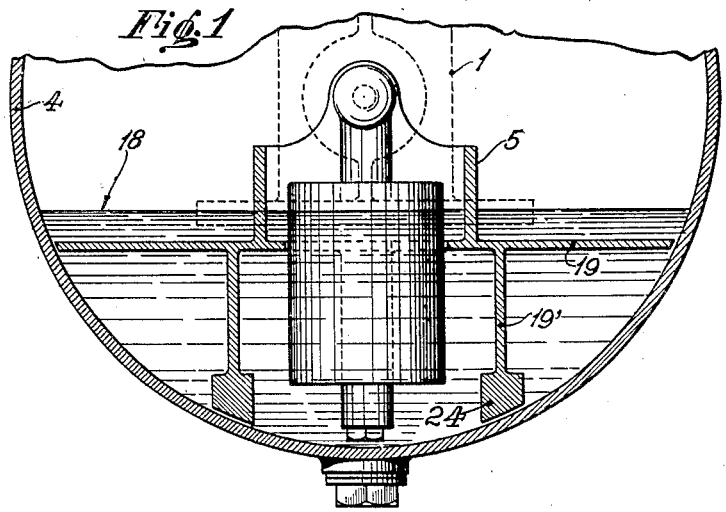
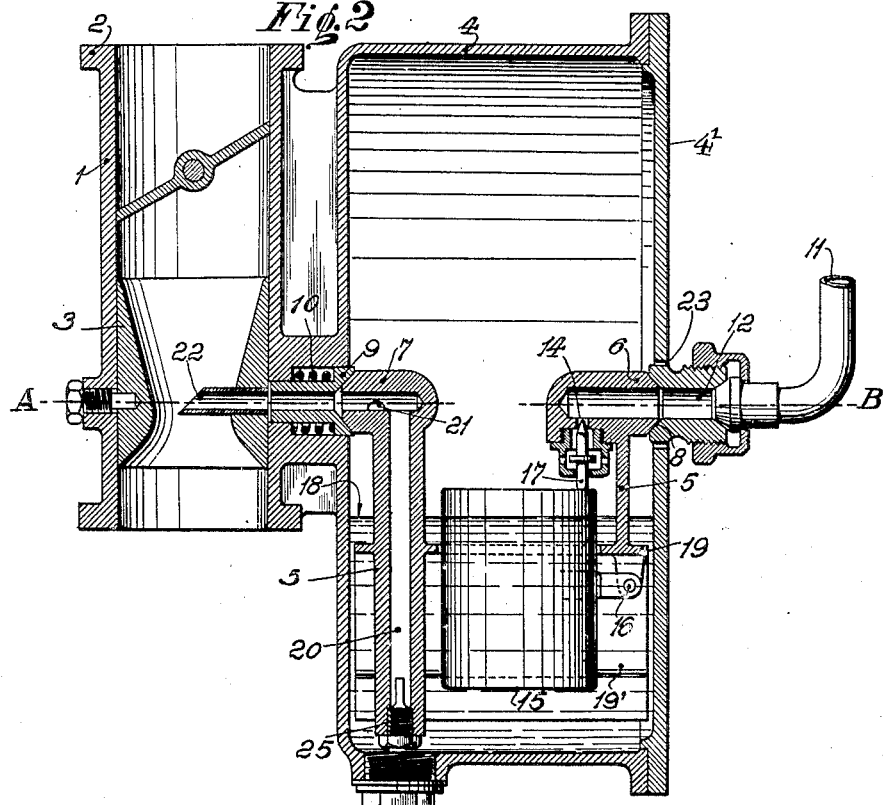
INVENTOR
Giacomo Memini
BY Morrison, Kennedy & Campbell
ATTORNEYS.

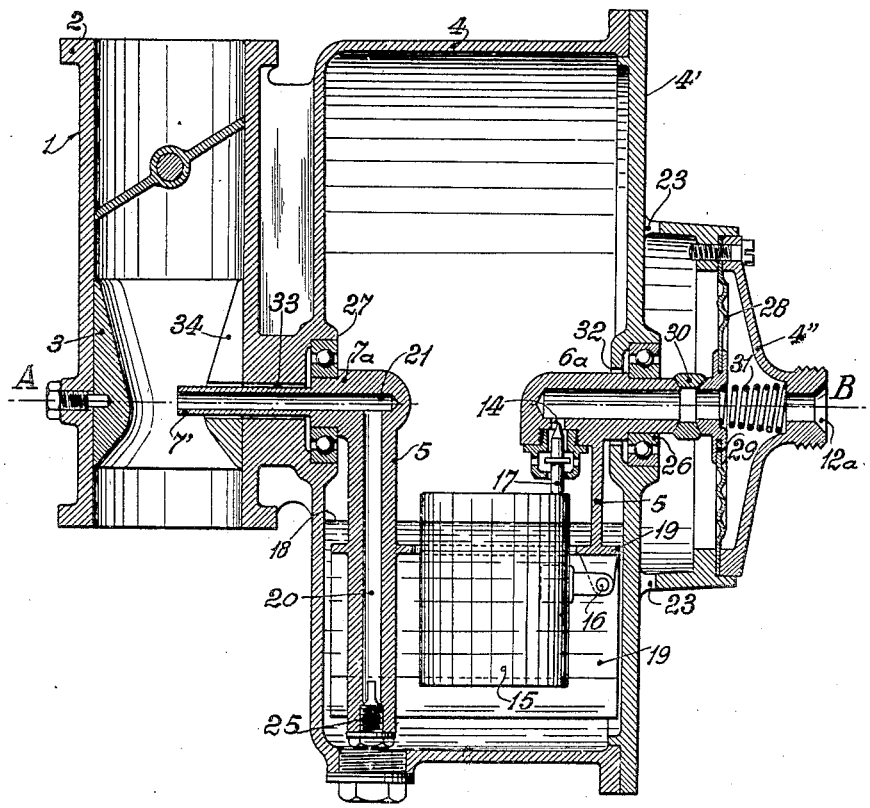

Patented June 27, 1933

1,916,061

UNITED STATES PATENT OFFICE

GIACOMO MEMINI, OF MILAN, ITALY

AIRCRAFT CARBURETOR

Application filed April 4, 1931, Serial No. 527,839, and in Italy April 14, 1930.

The present invention is a novel aircraft carburetor and has for its object to afford a carburetor for aircraft engines functioning in any position of the aircraft, that is, in normal flight, in upside down flight and in general acrobatic flight.

It is known, that, during horizontal flight, the inclinations which the areoplane may assume around its longitudinal axis (that is in turning) have no influence on the carburetion because the centrifugal force and gravity combined give a resultant which is always in the direction of the working of the constant level mechanism with which the carburetor is furnished, but this is not the case when the aeroplane revolves around a transverse axis, that is in "looping", in upside-down flight, in mounting up, in violent descent, etc.

The carburetor according to the invention functions equally well in these exceptional flights and is essentially characterized by the fact that the constant level vessel is substantially cylindrical and the mechanism of the float level is pivoted substantially on the axis of the vessel, being able to oscillate around this axis, the suspension pivots having conduits respectively for admission and for efflux of the fuel.

By way of example only, the attached drawings show two forms of apparatus, carrying out the object of the invention and, particularly shows the device as applied to a carburetor based on ordinary principles of action.

Fig. 1 is a transverse vertical section of a carburetor embodying the invention in one illustration form.

Fig. 2 is a longitudinal vertical section thereof.

Fig. 3 is a longitudinal vertical section of another illustrative form.

The diffuser or mixing nozzle, 3 is placed in the body 1 of the carburetor. On the horizontal axis A—B which is at right angles to the longitudinal axes of the aeroplane, that is to the direction of the motor shaft, and which passes through the narrowest point or throat of the diffuser, is placed a cylindrical box or vessel 4 closed by an appropriate cover 4'. A shiftable support or carrier in the form of a cage 5 can rotate around the axis A—B of box 4 being mounted or hung by means of two conical or spherical pivots 6 and 7, the first bearing in the corresponding fixed seat 8 formed or attached upon the cover 4' and the second bearing in the movable seat 9 in box 4, free to adjust along axis A, B; a strong helical spring 10 pressing the movable seat 9 constantly against the pivot 7 of cage 5 and thus pressing the cage or carrier against cover 4' so as to have perfect bearing of pivots 6 and 7 against their respective seats with non-leaking fit.

The liquid fuel or petrol coming, under pressure, from the petrol tank reaches the carburetor through tubing 11, passage 12 through the centre of seat piece 8 and pivot 6, and through a port 14 in the pivot. The flow of petrol into the vessel 4 is opened and interrupted by means of any control device as a float, adapted to maintain a nearly constant level in vessel 4'; by way of example, there is shown in the drawings a float 15 mounted on a lever pivoted at 16 to the carrier 5 and the movements of the float controlling a pin valve 17 seating in the lower side of the inlet port 14. Line 18 indicates the constant level of the fuel in the vessel.

A little below this level, the trunnion carrier 5 is formed with a flange or horizontal plate 19 from which project downwardly into the liquid a fin or fins 19'; the edges of the flange and of the fins being spaced but a very small distance from the walls of the vessel or box 4—4', and the flange 19 being suitably cut away to give the float 15 free up and down play.

At the lower end of fins 19' there may be masses 24 acting to weigh the peripheral or free lower end of the revoluble carrier or cage and bring it by gravity to the lowest point.

A device intended to insure the automatic or predetermined proportioning of the explosive mixture, by any known system, is situated in cage 5 in the opposite side to that of the inlet of petrol and, in the drawings, this is as already said, shown diagrammatically; a vertical conduit 20, leading into the central bore 21 of bearing 7 reaches down into the petrol contained in the lower section of vessel 4, while a conduit 22 extends through the seat piece 9 and projects into the interior of the diffusor 3. At one end or the other, or at any point in the channel formed by ducts 20, 21, 22 the proportioning device is situated. In the drawings a jet or nozzle 25, with a calibrated orifice, is shown diagrammatically.

The vessel 4 is kept in direct communication with the air through openings 23 provided for example near the centre of the cover 4′.

In whatever position the aeroplane may assume around the transverse axis, the suspended carrier or cage 5 being rotable around axis A, B, will remain in equilibrium practicably vertical, due to the effect obtained by the weight of the vessel itself and by the petrol which is kept substantially imprisoned between the flanges and fins of the cage from which it can only escape relatively slowly, through the small clearance spaces existing around them. The parts of the cage or carrier and the liquid fuel have a mutually damping action tending to keep them steady at the lowest point.

The efficiency of the apparatus, that is the ease with which cage 5 tends to seek and keep the vertical position when the motor and aeroplane and therefore the vessel 4 turn around axis A—B or around an axis parallel to this, depends on the pressure of spring 10, on the nature and form of pivots 6 and 7, on the weight of the cage and on the clearance spaces at the edges of flanges 19 and fins 19′ which may be varied according to the requirements.

In the variant shown by Fig. 3, the hollow-shaft form of pivots 6a and 7a, of the movable cage 5, are placed on axis A—B of the cylindrical vessel 4 and are able to turn in their seats either directly or through the intervention of ball bearings 26 and 27.

Bearing 6a is the one which also serves as intake conduit for the fuel; this forms a union under suitable pressure at 12a and serves to fill a space to the right of and confined by a flexible metallic diaphragm 28 similar to those used in gauges and barometers. This diaphragm is clamped and held tight between the rims of 4′ and 4″ at its outer edge and is also held tight, at its inner edge, to a flange 29. Between the two substantially spherical ends of the pivot 6a and of the central appendage to the flange 29, a complementary ring 30 is interposed, also with spherical but concave faces, and is kept tight by the pressure of the fuel on the flexible diaphragm or disc 28 and perferably also by supplementary pressure from a spring 31.

The device for the intake of fuel as in Fig. 3 is intended to insure the tightness of the spherical joint during rotation of the cage, namely by a pressure on the spherical faces which is practically proportional to the pressure of the incoming fuel.

The permanent communication between the inside of the vessel and the atmosphere is through openings 23, and through the interstices between the elements of the ball bearings 26 and through the loose fit at 32. Pivot 7a serves also to carry the fuel, or the mixture of fuel and air, from the constant level vessel to the mixing or carburetion point 1 and, for this purpose, it penetrates, with a diminishing bore 7′, nearly to the centre of the diffuser 3; any air which may leak in along the slight clearance 33 of the pivot, will not influence the carburetion since, the play being constant, any air so passing can be taken into account at the time of regulating the supply.

The Venturi diffuser 3 may have a slot 34 to permit of it being withdrawn from the mixing tube 1 without having first to take out pivot 7′.

In practice the particular manner of carrying out the principles of the present invention may undergo many variations without departing from the scope of the invention.

Having now particularly described and ascertained the nature of my said invention and in what manner the same is to be performed I declare that what I claim is:

1. An aircraft carburetor operable in any angular position of the aircraft, comprising a constant level vessel containing liquid fuel, a swingable carrier of open construction having pivot means and depending by gravity from such pivot means into the body of liquid fuel in the vessel, inlet and outlet passages for the inflow of fuel to the vessel and the outflow of fuel from the vessel to the carburetion point, a valve controlling the inlet passage, and a float device movably mounted on the swingable carrier to operate the inlet valve to maintain a constant level of fuel in the vessel; the constant level vessel being formed by fixed end walls and a substantially cylindrical wall concentric with the swinging axis of the contained carrier; and the carrier being formed with outwardly extending fins or flanges reaching nearly to the vessel walls and submerged in the liquid fuel therein.

2. An aircraft carburetor operable in any angular position of the aircraft, comprising a constant level vessel containing liquid fuel, a swingable carrier having pivot means and depending by gravity from such pivot means into the body of liquid fuel in the vessel, inlet and outlet passages for the inflow of fuel to the vessel and the outflow of fuel from the vessel to the carburetion point, a valve controlling the inlet passage, and a float device movably mounted on the swingable carrier to operate the inlet valve to maintain a constant level of fuel in the vessel; the carrier having one or more submerged fins affording a damping engagement between the carrier and liquid fuel.

3. An aircraft carburetor operable in any angular position of the aircraft, comprising a constant level fuel vessel having fixed walls, a swingable carrier having pivot means and depending by gravity from such pivot means into the body of liquid fuel in the vessel and having submerged damping extensions preventing swinging oscillation of the carrier, inlet and outlet passages respectively for the inflow of fuel to the vessel and the outflow of fuel from the vessel to the carburetion point, a valve controlling the inlet passage, and a float device movably mounted on the swingable carrier to operate the inlet valve to maintain a constant level of fuel in the vessel.

4. An aircraft carburetor operable in any angular position of the aircraft, comprising a constant level vessel containing liquid fuel, a swingable carrier of open construction having pivoting means and depending below such pivot means into submergence in the body of liquid fuel in the vessel, inlet and outlet passages for the inflow of fuel to the vessel and the outflow of fuel from the vessel to the carburetion point, a valve device controlling the inlet passage, and a float device movably mounted on the swingable carrier below the axis of carrier swinging and connected to operate the inlet valve device to maintain a constant level of fuel in the vessel substantially lower than the axis of carrier swinging.

5. A carburetor as in claim 4 and wherein the constant level vessel is fixed and is provided with aeration openings near the axis of swinging and above the constant level of liquid in all angular positions of the aircraft.

6. A carburetor as in claim 4 and wherein the pivoting means of the carrier comprises a hollow pivot containing the fuel inlet passage above the constant fuel level.

7. A carburetor as in claim 4 and wherein the pivoting means of the carrier comprises a hollow pivot containing the fuel inlet passage above the constant fuel level, and the valve device comprises a movable valve at the inner end of such inlet passage wholly above the constant fuel level and closed by the rise of the float device.

8. A carburetor as in claim 4 and wherein the pivoting means of the carrier comprises a hollow pivot containing the fuel outlet passage above the constant fuel level, and the carrier carries an outlet duct open at a submerged point and rising into communication with said pivot outlet passage.

9. A carburetor as in claim 4 and wherein the pivoting means of the carrier comprises a hollow pivot containing the fuel outlet passage above the constant fuel level, and the carrier carries an outlet duct open at a submerged point and rising into communication with said pivot outlet passage, with a calibrated restriction in said duct or passage to impose a maximum limit to the rate of fuel outflow from the vessel to the carburetion point.

10. An aircraft carburetor operable in any angular position of the aircraft, comprising a constant level vessel containing liquid fuel, a swingable carrier of open construction having pivoting means and depending from such pivot means into the body of liquid fuel in the vessel, the pivot means comprising an axial inlet tube for the inflow of fuel to the vessel, said tube attached to the carrier so as to rotate with the swing of the carrier, a float controlled valve device at the interior end of the inlet tube, a non-rotary coupling member engaging with the outer end of the rotary inlet tube, said coupling member being perforated, a diaphragm carrying said coupling member, and a fixed wall enclosing, with said diaphragm a fuel inlet pressure chamber, and having a fuel inlet passage from a fuel supply under pressure, whereby the pressure in said pressure acting on said diaphragm tends to hold said coupling member in fluid-tight engagement with said inlet tube.

In testimony whereof, this specification has been duly signed by:

GIACOMO MEMINI.